US009600863B2

(12) United States Patent
Xiong et al.

(10) Patent No.: US 9,600,863 B2
(45) Date of Patent: Mar. 21, 2017

(54) METHOD FOR COMBINING IMAGES (75) Inventors: Weihua Xiong, Cupertino, CA (US); Jizhang Shan, Cupertino, CA (US); Donghui Wu, Sunnyvale, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 450 days.

(21) Appl. No.: 13/371,737

(22) Filed: Feb. 13, 2012

(65) Prior Publication Data
US 2013/0208081 A1    Aug. 15, 2013

(51) Int. Cl.
H04N 7/00    (2011.01)
H04N 9/00    (2006.01)
H04N 17/02    (2006.01)
G06T 3/60    (2006.01)
G06T 7/00    (2006.01)

(52) U.S. Cl.
CPC ............... G06T 3/60 (2013.01); G06T 7/002 (2013.01); G06T 7/0028 (2013.01); G06T 7/33 (2017.01); G06T 7/85 (2017.01); G06T 2207/30208 (2013.01); G06T 2207/30252 (2013.01)

(58) Field of Classification Search
None
See application file for complete search history.

(56) References Cited

U.S. PATENT DOCUMENTS 6,002,430 A * 12/1999 McCall .............. H04N 5/23238 348/143
6,133,943 A * 10/2000 Needham ................... 348/37
6,157,747 A * 12/2000 Szeliski et al. ........... 382/284
7,103,236 B2 * 9/2006 Peterson .................... 382/294
7,268,803 B1 * 9/2007 Murata et al. ............. 348/218.1
(Continued)

FOREIGN PATENT DOCUMENTS

TW    M373507    2/2010
TW    201140494 A    11/2011

OTHER PUBLICATIONS

Lagarias, J. C., et al., "Convergence Properties of the Nelder-Mead Simplex Method in Low Dimensions," © 1998 Society for Industrial and Applied Mathematics, SIAM J. OPTIM. vol. 9, No. 1, pp. 112-147.

(Continued)

Primary Examiner — Jorge L Ortiz Criado
Assistant Examiner — Samuel D Fereja
(74) Attorney, Agent, or Firm — Blakely Sokoloff Taylor & Zafman LLP (57) ABSTRACT A method for combining images includes capturing a first image including a subject from a first camera. A second image is captured from a second camera and the second image includes the subject. First pre-processing functions are applied on the first image to produce a first processed image. The first pre-processing functions include applying a distortion component of a rotation matrix to the first image. The rotation matrix defines a corrected relationship between the first and the second image. Second pre-processing functions are applied on the second image to produces a second processed image. The second pre-processing functions include applying the rotation matrix to the second image. The first processed image and the second processed image are blended in a processing unit to form a composite image.

23 Claims, 7 Drawing Sheets

(56) References Cited

U.S. PATENT DOCUMENTS

| | | | |
|---|---|---|---|
| 7,307,655 B1* | 12/2007 | Okamoto et al. | 348/222.1 |
| 7,471,489 B2* | 12/2008 | Lai et al. | 360/265.7 |
| 7,821,679 B2* | 10/2010 | Hatzav et al. | 348/262 |
| 8,224,121 B2* | 7/2012 | Safai et al. | 382/294 |
| 2003/0133019 A1* | 7/2003 | Higurashi et al. | 348/218.1 |
| 2005/0007483 A1* | 1/2005 | Zimmermann | G06T 15/20 348/335 |
| 2007/0236595 A1* | 10/2007 | Pan | G06T 3/0018 348/335 |
| 2007/0291895 A1* | 12/2007 | Yin | A61B 6/025 378/20 |
| 2008/0056612 A1* | 3/2008 | Park et al. | 382/284 |
| 2008/0143748 A1* | 6/2008 | Jin et al. | 345/649 |
| 2008/0211956 A1* | 9/2008 | Imada et al. | 348/340 |
| 2009/0058991 A1* | 3/2009 | Kim et al. | 348/37 |
| 2010/0097444 A1* | 4/2010 | Lablans | 348/46 |
| 2011/0164783 A1* | 7/2011 | Hays et al. | 382/100 |
| 2012/0154548 A1* | 6/2012 | Zargarpour et al. | 348/48 |
| 2012/0176515 A1* | 7/2012 | Teo | 348/239 |

OTHER PUBLICATIONS

TW Patent Application No. 102104965—Taiwanese Office Action and Search Report, with English Translation, issued Jan. 23, 2015 (12 pages).
CN Patent Application No. 201310050822.6—Chinese Office Action and Search Report, with English Translation, issued May 6, 2015 (23 pages).
CN Patent Application No. 201310050822.6—Chinese Office Action, with English Translation, issued Nov. 19, 2015 (18 pages).
CN Patent Application No. 201310050822.6—Chinese Office Action and Search Report, with English Translation, issued May 6, 2016 (5 pages).

* cited by examiner

METHOD FOR COMBINING IMAGES

TECHNICAL FIELD

This disclosure relates generally to image processing, and in particular but not exclusively, relates to combining images.

BACKGROUND INFORMATION

The use of camera systems is increasing due to the decreasing price of camera systems and the relative availability of processing power and data storage. Image sensors in cameras and camera systems are used in a variety of applications including automotive, medical, mobile, and security and surveillance. Often times, these applications include the need for more than one camera and to combine the images from the cameras, which may be presented to a user.

In some cases, there is a need to produce panoramic images or even 360 degree images. Panoramic or 360 degree images may be obtained by incorporating many cameras and combining images from the many cameras. However, each camera increases the cost of a camera system and combining many images from many cameras increases the processing time to generate a panoramic or 360 degree image. Delayed processing of many images may be particularly problematic when the desired processing is real-time. One solution for decreasing the number of cameras needed to produce panoramic or 360 degree images is to use wide-angle cameras. However, image distortion from the wide-angle lenses complicates matching and blending images, especially in real-time. As a result, an efficient method for combining images with lens distortion is desirable.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a system and method for combining images are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
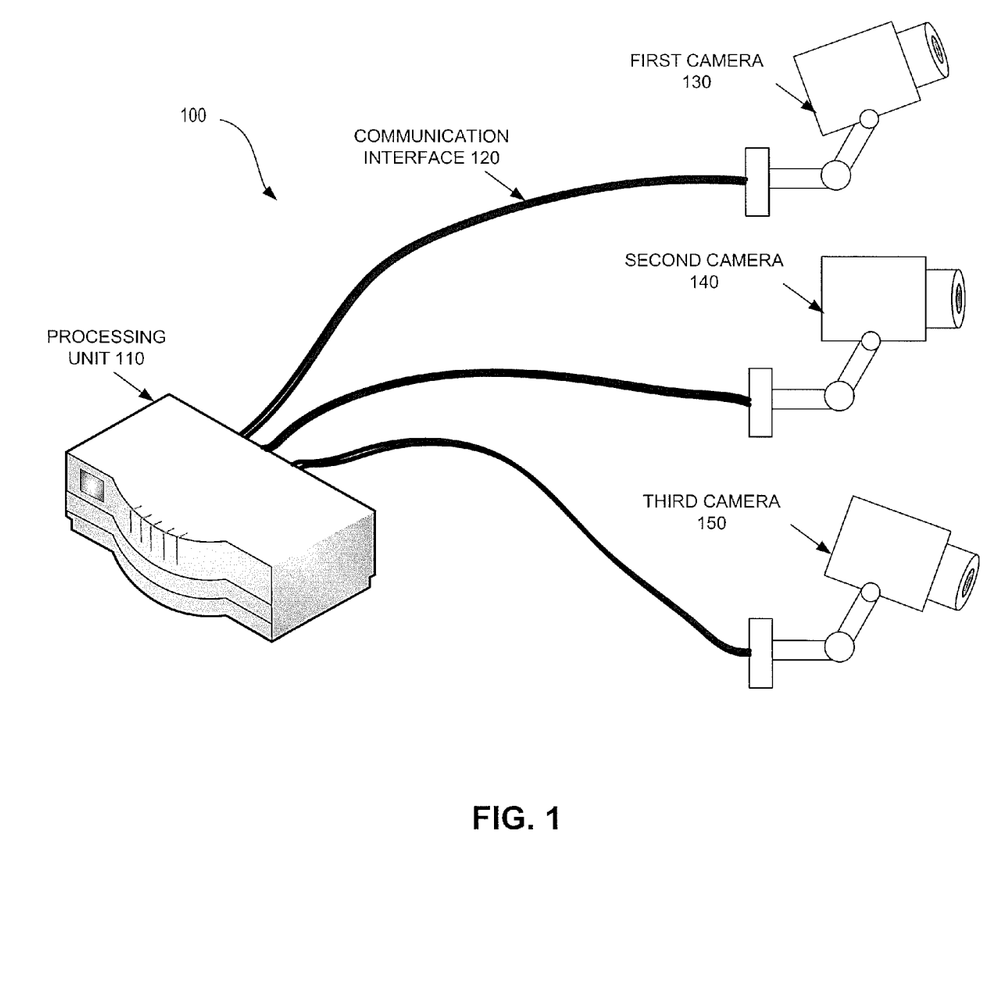
FIG. 1 is a functional block diagram illustrating a camera system, in accordance with an embodiment of the disclosure.

FIG. 1 is a functional block diagram illustrating a camera system, in accordance with an embodiment of the disclosure. Camera system 100 includes a processing unit 110, communication interfaces 120, a first camera 130, a second camera 140, and a third camera 150. Camera system 100 may include additional cameras or fewer cameras (no fewer than two). FIG. 1 illustrates communication interfaces 120 being a physical connection between processing unit 110 and first camera 130, second camera 140, and third camera 150, however the communication interfaces between processing unit 110 and any camera may be wireless communication interfaces. Additionally, camera system 100 may be integrated into one physical unit. For example, a mobile device may have two cameras and a processing unit all integrated into the mobile device.

First camera 130, second camera 140, and third camera 150 may capture images and transmit the captured images to processing unit 110. Processing unit 110 may contain a memory to store images and store values for processing purposes. Processing unit 110 may have an output coupled to transmit images from the cameras to a display device such as an LCD monitor. The processing unit contains a processor capable of blending images from different cameras to produce a composite image. The composite image may be transmitted to a display device for a user to view.

Figure 2:
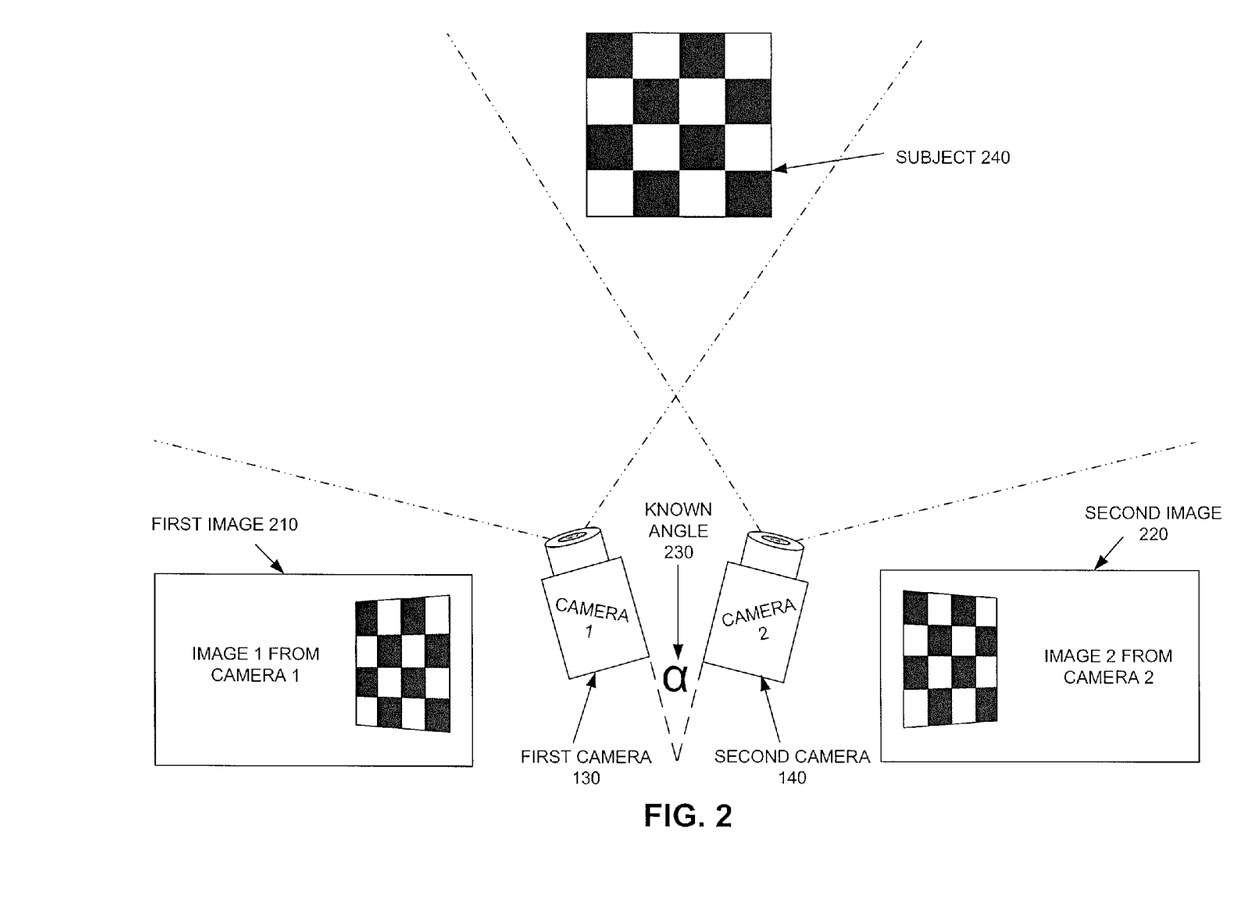
FIG. 2 is a functional block diagram illustrating two cameras in a camera system, in accordance with an embodiment of the disclosure.

FIG. 2 is a functional block diagram illustrating two cameras in camera system 100. In the embodiment of camera system 100 illustrated in FIG. 2, first camera 130 is identical to second camera 140 and both cameras have wide-angled lenses. First camera 130 and second camera 140 are at slightly different physical locations and are separated by a known angle 230 (α). Since first camera 130 and second camera 140 are at slightly different locations, they have different fields of view. However, the field of view of first camera 130 and second camera 140 both include a subject 240. Subject 240 is illustrated as a rectangle with a checkerboard pattern on it. However, subject 240 could be any person, place, or thing.

A first image 210 illustrates an image captured by first camera 130 and a second image 220 illustrates an image captured by second camera 140. The checkerboard pattern of subject 240 is illustrated differently in first image 210 than in second image 220. However, the checkerboard illustrations in first image 210 and second image 220 are not meant to be accurate depictions of images captured by first camera 130 and second camera 140; the checkerboard illustrations are simply meant to show that first camera 130 and second camera 140 are at different angles and capture subject 240 from different perspectives.

Figure 3:
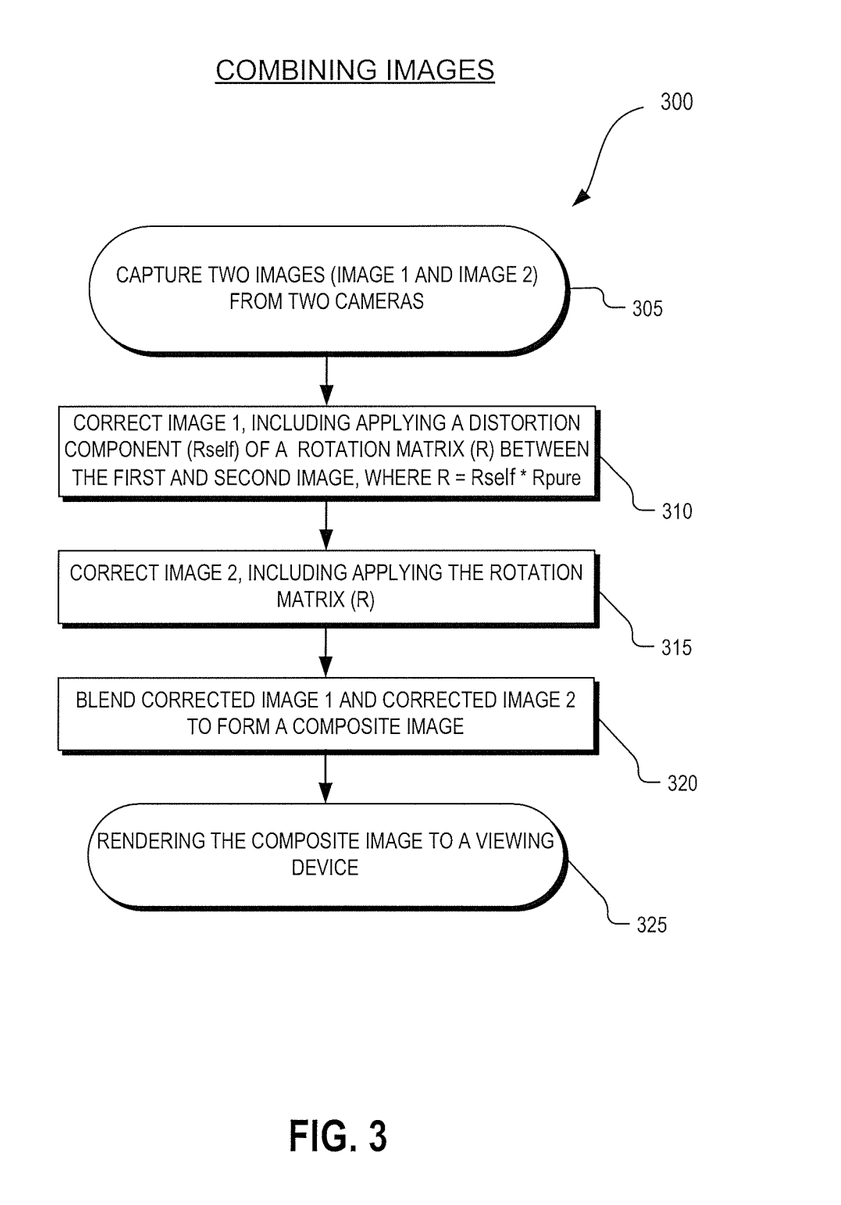
FIG. 3 is a flow chart illustrating a process for combining images, in accordance with an embodiment of the disclosure.

FIG. 3 is a flow chart illustrating a process 300 for combining images, in accordance with an embodiment of the disclosure. The order in which some or all of the process blocks appear in process 300 should not be deemed limiting. Rather, one of ordinary skill in the art having the benefit of the present disclosure will understand that some of the process blocks may be executed in a variety of orders not illustrated, or even in parallel.

In process block 305, two images (Image 1 and Image 2) are captured from two different cameras. First image 210 from first camera 130, and second image 220 from second camera 140 are examples of two imaged that may be used in process block 305. The captured images may be stored in a memory for processing. In process block 310, Image 1 (e.g. first image 210) is corrected in preparation of blending Image 1 and Image 2. One of the corrections applied to Image 1 is a distortion component (Rself) of a rotation matrix (R) between the first and second image. The rotation matrix (R) is defined by multiplying the distortion component and a rotation component (R=Rself*Rpure). The distortion component (Rself) corrects for lens distortions. For example, Rself may correct the lens distortion from a wide-angle lens. A rotation component (Rpure) corrects for the angle or rotation between the two images. Image 1 is a reference image so a rotation component (Rpure) of the rotation matrix does not need to be applied, but Rself needs to be applied to Image 1 to correct for lens distortion. The application of Rself to Image 1 (process block 310) may include multiplying each pixel of Image 1 by Rself.

In process block 315, Image 2 (e.g. second image 220) is corrected in preparation of blending Image 1 and Image 2. One of the corrections applied to Image 1 is the rotation matrix (R). The application of rotation matrix (R) in process block 315 may include multiplying each pixel of Image 2 by the rotation matrix (R). Corrected Image 1 and corrected Image 2 are blended together to form a composite image in process block 320. The processing associated with forming the composite image may be done by processing unit 110. The composite image is stored and rendered to a viewing device in process block 325. The viewing device may be a computer monitor such as an LCD.

One of the efficiencies of process 300 is the ability to correct for both image distortion (Rself) and camera rotation (Rpure) in one step. For example, process block 315 applies image distortion correction (Rself) and rotation correction (Rpure) in one step by simply applying the product (R) of Rpure and Rself to Image 2. To decrease processing time even further, the distortion component (Rself) and the rotation component (Rpure) may be calibrated previously. Then, the process of combining two images will not have to include calculating a rotation mapping location of each pixel of a proceeding image. Therefore, applying correction values in one step and having previously calibrated values for Rself, Rpure, and R allows for streamlined processing of the images for combination.

Figure 4:
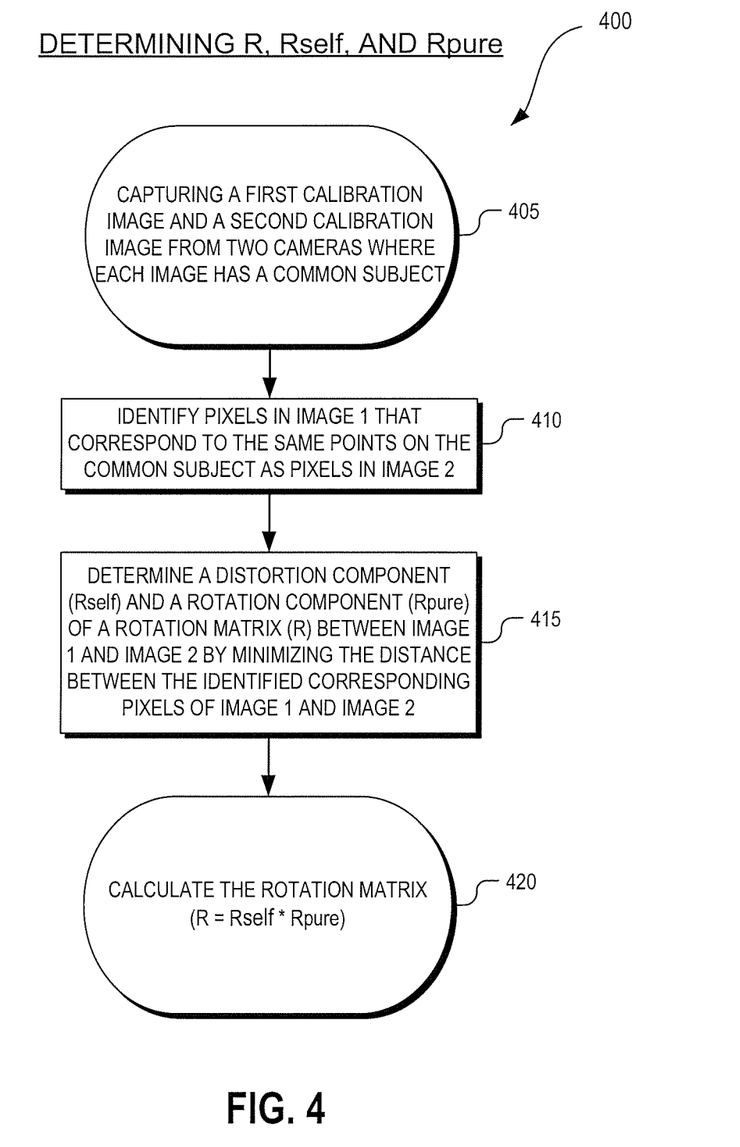
FIG. 4 is a flow chart illustrating a process for determining values associated with combining images, in accordance with an embodiment of the disclosure.

FIG. 4 is a flow chart illustrating a process 400 for determining values associated with combining images, in accordance with an embodiment of the disclosure. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel.

Rself, Rpure, and R are examples of values associated with combining images. In process block 405, a first calibration image and a second calibration image are captured from two different cameras. First image 210 and second image 220 are examples of images that may be used as calibration images. The first calibration image and the second calibration image share a common subject (e.g. subject 240), or at least a portion of a common subject. The subject may be specifically designed for a calibration procedure. In process block 410, pixels are identified in the first calibration image and the second calibration image that correspond to the same points on the common subject.

In process block 415, a distortion component (Rself) and a rotation component (Rpure) are determined between Image 1 and Image 2 by minimizing the distance between the identified corresponding pixels of Image 1 and Image 2. The rotation matrix (R) is then calculated by multiplying Rself by Rpure. One or more of values Rself, Rpure, and R may be stored in a memory accessible to a processing unit (e.g. processing unit 110) for future processing associated with combining images from the two cameras that the images came from.

In some cases, the calibrated value for Rself can be used in processing or correcting images from different cameras than the two cameras that generated the calibration images. For example, if the first calibration image and the second calibration image came from first camera 130 and first camera 140, then Rself would be calculated based on those two cameras. Yet, because Rself corrects for lens distortion, Rself may be used to correct for lens distortion in other cameras with the same lenses and image sensors. Therefore, Rself may be applied to images from third camera 150 if the imaging capturing components (e.g. image sensor and lenses) of third camera 150 are substantially identical to first camera 130 and second camera 140. Additionally, Rself may be applied to images taken from second camera 140 in order to combine those images with images taken from third camera 150 (assuming second camera 140 and third camera 150 have the same lenses and images sensors).

Figures 5A, 5B:
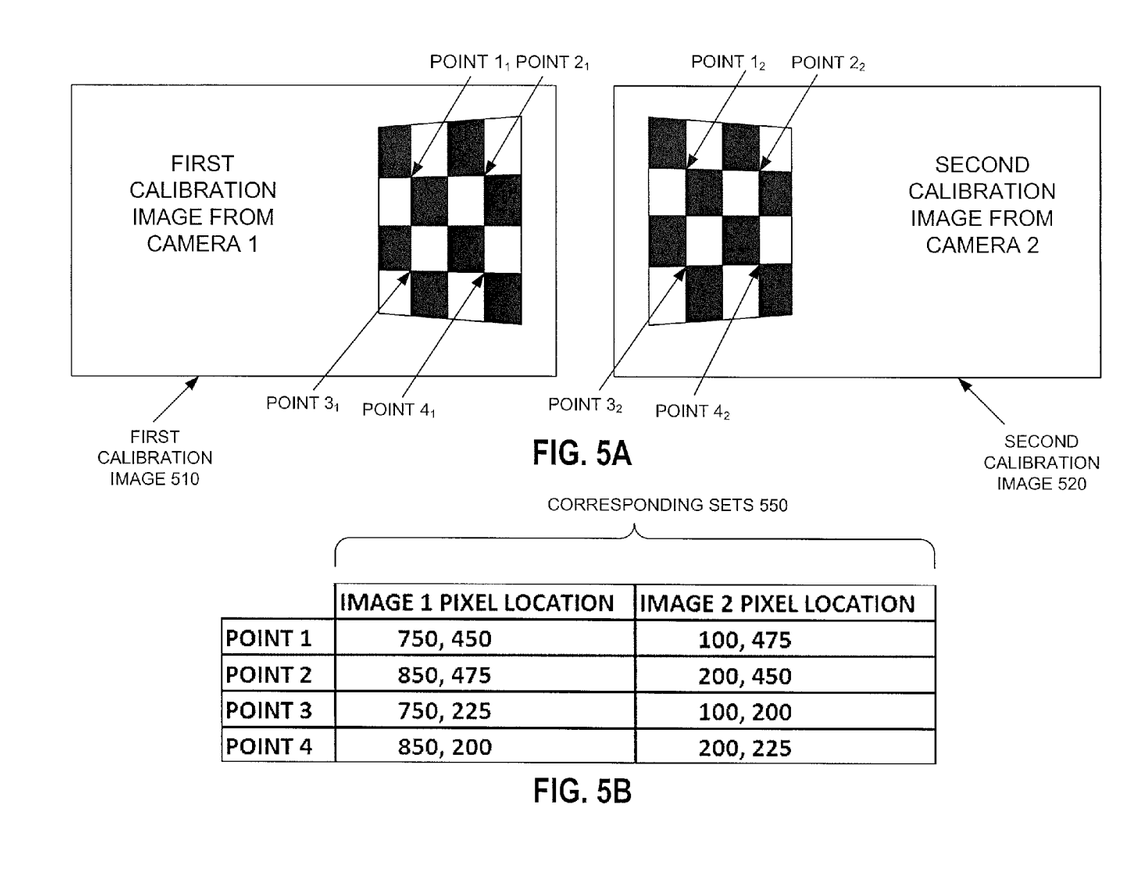
FIG. 5A is a diagram illustrating approximations of two calibration images, in accordance with an embodiment of the disclosure.
FIG. 5B is a chart illustrating example calibration data associated with the illustrations of FIG. 5A, in accordance with an embodiment of the disclosure.

FIG. 5A is a diagram illustrating approximations of two calibration images and FIG. 5B is a chart showing example calibration points associated with the two calibration images in FIG. 5A, in accordance with an embodiment of the disclosure. FIGS. 5A and 5B illustrates one possible method of implementing process block 410 (identifying pixels in Image 1 that correspond to the same points on the common subject as pixels in Image 2). FIG. 5A includes a first calibration image 510 and a second calibration image 520. First calibration image 510 includes Points $1_1$, $2_1$, $3_1$, and $4_1$. Each of the Points $1_1$, $2_1$, $3_1$, and $4_1$, are at different intersections of two black squares and two white square in a checkerboard pattern. The checkerboard pattern is a common subject between first calibration image 510 and second calibration image 520. Second calibration image 520 includes Points $1_2$, $2_2$, $3_2$, and $4_2$. Point $1_2$ is at the same intersection in the checkerboard pattern as Point $1_1$. In other words, Point $1_1$ corresponds to Point $1_2$ because they represent the same point on the common subject. The pixel locations of Point $1_1$ and Point $1_2$ are a corresponding set. Similarly Point $2_1$ and Point $2_2$ represent the same point on the common subject (a different intersection of two black squares and two white squares on a checkerboard pattern), so their pixel locations are also a corresponding set. The pixel locations for Point $3_1$ and Point $3_2$ are a corresponding set, as are the pixel locations for Point $4_1$ and Point $4_2$.

FIG. 5B illustrates that each Point has an example pixel location. The illustrated first calibration image 510 and second calibration image 520 are each 1000×600 pixels. However the pixel locations shown in FIG. 5B are for illustration only and may not be the exact locations of the actual Points in FIG. 5A. For Image 1, the pixel location for Point $1_1$ is shown as 750, 450. The corresponding pixel location for Point $1_2$ (in Image 2) is shown as 100, 475. The illustrated pixel locations of Point $1_1$ and Point $1_2$ are one of the corresponding sets in corresponding sets 550. The pixel locations for Point $2_1$ and Point $2_2$ are also one of the corresponding sets in corresponding sets 550. The pixel locations for Points $3_1$ and Point $3_2$, and for Points $4_1$ and Point $4_2$ are also corresponding sets in corresponding sets 550.

Points $1_1$, $2_1$, $3_1$, and $4_1$ and corresponding Points $1_2$, $2_2$, $3_2$, and $4_2$ may be identified by imaging software known in the art. To make the calibration procedure more accurate, it may be helpful for the common subject to have easily identifiable corresponding points. Hence, a calibration pattern may be used as the common subject. More complicated patterns that identify more corresponding points between the two images may be used to increase the accuracy of the calibration.

Figure 6:
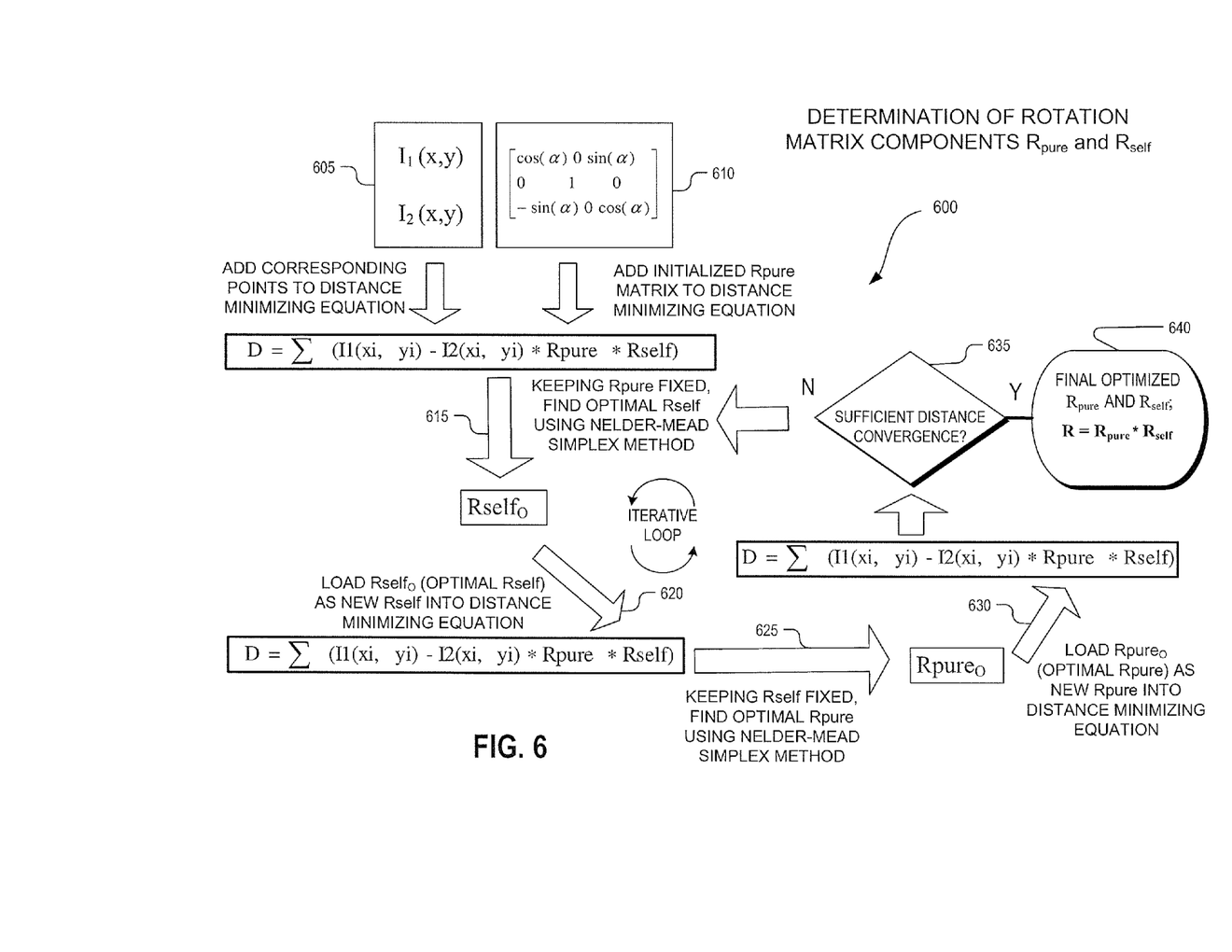
FIG. 6 is a flow diagram illustrating a process for determining values associated with combining images, in accordance with an embodiment of the disclosure.

FIG. 6 is a flow diagram illustrating a process 600 for determining values associated with combining images, in accordance with an embodiment of the disclosure. The order in which some or all of the process blocks appear in process 600 should not be deemed limiting. Rather, one of ordinary skill in the art having the benefit of the present disclosure will understand that some of the process blocks may be executed in a variety of orders not illustrated, or even in parallel.

FIG. 6 illustrates one possible method of implementing process block 415 (determining a distortion component (Rself) and a rotation component (Rpure) of a rotation matrix (R) between Image 1 and Image 2 by minimizing the distance between the identified corresponding pixels of Image 1 and Image 2). For ease of explanation, the examples in FIGS. 5A and 5B will be imported to describe process 600. However, it is understood that process 600 applies to different examples that include different images and differing numbers of corresponding points and pixel locations.

In process block 605, pixel locations of corresponding points (e.g. Point $1_1$ and Point $1_2$) between first calibration image 510 and second calibration image 520 are loaded into a distance minimizing equation. The distance minimizing equation is shown as:

$$D = \Sigma(I1(xi,yi) - I2(xi,yi)*Rpure*Rself)$$

In the distance minimizing equation, I1 (xi,yi) represents the pixel location of a point in first calibration image 510 (e.g. Point $1_1$) that corresponds with the same point (e.g. Point $1_2$) in second calibration image 520. I2(xi,yi) represents the pixel location of the corresponding point (e.g. Point $1_2$) in second calibration image 520. The summation nature of the distance minimizing equation allows all of the pixel locations in corresponding sets 550 to be loaded into the distance minimizing equation to be summed together. The D in the distance minimizing equation represents the distance between the corresponding pixels. Rpure represents a rotation component of a rotation matrix between the cameras that generated first calibration image 510 and second calibration image 520. And, Rself represents a distortion component of the rotation matrix.

In process block 610, an initialized 3×3 Rpure matrix is loaded into the distance minimizing equation. The α in the initialized 3×3 Rpure matrix represents a known angle between the cameras that generated the images used to identify the corresponding points. The given initialized 3×3 Rpure matrix is:

$$\begin{bmatrix} \cos(\alpha) & 0 & \sin(\alpha) \\ 0 & 1 & 0 \\ -\sin(\alpha) & 0 & \cos(\alpha) \end{bmatrix}$$

After the corresponding points and the initialized Rpure matrix is added to the distance minimizing equation, the optimal Rself is calculated at process block 615. Keeping Rpure fixed, the optimal Rself is calculated using the Nelder-Mead Simplex Method. The Nelder-Mead Simplex Method is described in "Lagarias, J. C., J. A. Reeds, M. H. Wright, and P. E. Wright, "Convergence Properties of the Nelder-Mead Simplex Method in Low Dimensions," SIAM Journal of Optimization, Vol. 9 Number 1, pp. 112-147, 1998."

When the optimal Rself ($Rself_O$) is found, $Rself_O$ is loaded into the distance minimizing equation to become the new Rself, which replaces the previous Rself (process block 620). At process block 625, the new Rself is fixed and the optimal Rpure is calculated by using the Nelder-Mead Simplex Method. When the optimal Rpure ($Rpure_O$) is found, $Rpure_O$ is loaded into the distance minimizing equation to become the new Rpure, which replaces the previous Rpure (process block 630). At process block 635, if the Distance (D) is sufficiently converged, then the current Rpure and Rself values become the Final Optimized Rpure and Rself values. Then the rotation matrix (R) is calculated by multiplying Rpure by Rself. Some or all of these values may then be saved to a memory for future use in processing. If the Distance (D) is not sufficiently converged, then the distance minimizing equation goes through another iteration. The next iteration will start at process block 615 and take the distance minimizing equation through process blocks 620, 625, and 630 again, until the equation reaches process block 635 again.

All or portions of processes 400, 500, and 600 may be calibration procedures performed at a manufacturing facility. Alternatively, processes 400, 500, and 600 could be done at an installation location of camera system 100. Camera system 100 may include a camera mount that contains user-selectable positions for first camera 130 and second camera 140. The mount may also contain user-selectable positions for three or more cameras (e.g. third camera 150). In one embodiment, the cameras are able to report back to processing unit 110 (via communication interfaces 120) as to which user-selectable position the camera occupies. Since the user-selectable positions in the camera mount will be at known angles (e.g. 15°, 25°, 35°), the processing unit may have pre-calibrated values for Rself, Rpure, and R, associated with the known angles, already stored in a memory of the processing unit. The Rself, Rpure, and R values associated with the different known angles, would then be used in processes (e.g. process 300) that combine images captured by two cameras.

Figure 7:
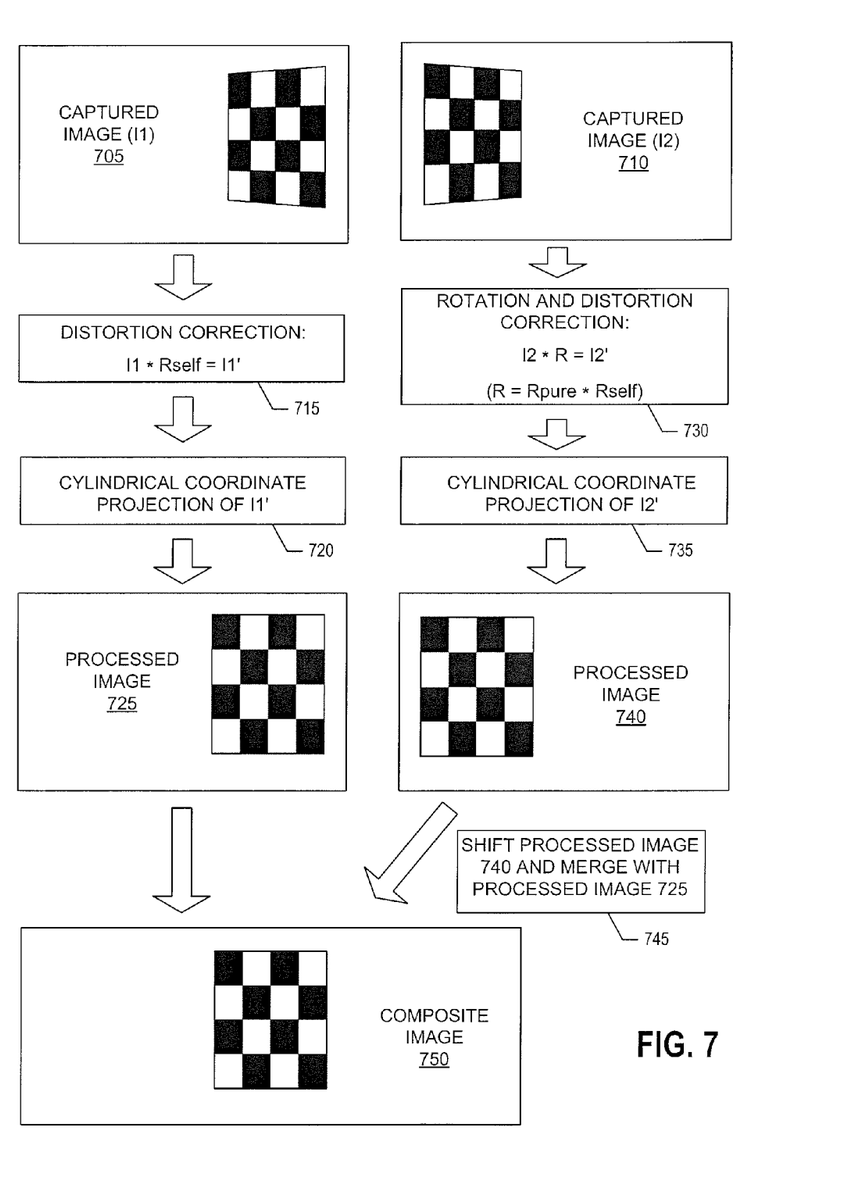
FIG. 7 is flow diagram illustrating a process for combining images, in accordance with an embodiment of the disclosure.

FIG. 7 is flow diagram illustrating a process 700 for combining images, in accordance with an embodiment of the disclosure. The order in which some or all of the process blocks appear in process 700 should not be deemed limiting. Rather, one of ordinary skill in the art having the benefit of the present disclosure will understand that some of the process blocks may be executed in a variety of orders not illustrated, or even in parallel.

FIG. 7 diagrams one example of a portion of process 300. Captured image 705 is captured from a first camera (e.g. first camera 130) and captured image 710 is captured from a second camera (e.g. second camera 140). The first camera and the second camera were identical and captured the illustrated checkerboard pattern at a known angle. The rotation matrix (R) and the components of the rotation matrix (Rpure and Rself) between the first camera and the second camera were already determined. The rotation matrix and the components of the rotation matrix may have been determined using process 400. In FIG. 7, I1 represents captured image 705 in process block 715 and I2 represents captured image 710 in process block 730.

In process block 715, distortion correction is applied to captured image 705 by multiplying captured image 705 by the distortion component (Rself) of the rotation matrix (R). This multiplication may be done on the pixel level to adjust pixel locations in captured image 705. I1' represents the result of the multiplication. In process block 720, I1' is projected on a cylindrical coordinate system. The formula for projecting I1' on a cylindrical coordinate system is:

$$x_{cyn\_i} = \arctan(x_i/f)$$

$$y_{cyn\_i} = f*(y_i/\sqrt{x_i^2+f^2})$$

The $x_i$ variable represents the row coordinate for each pixel in I1' and the $y_i$ variable represents the column coordinate for each pixel in I1'. The f variable is the focal length of the camera. Since the first camera and the second camera are identical, their focal length is the same. The result of the calculations yield cylindrical coordinate system values $x_{cyn\_i}$ and $y_{cyn\_i}$ for each pixel of I1'. The cylindrical coordinate projection transforms I1' into processed image 725.

In process block 730, a rotation component (Rpure) and a distortion correction (Rself) are applied to captured image 710. However, both components are applied in one step, by simply multiplying captured image 710 by the rotation matrix (R), which is already calculated. I2' represents the result of the multiplication. In process block 735, I2' is projected on a cylindrical coordinate system using the same formulas used in process block 720. The cylindrical coordinate projection transforms I2' into processed image 740. The altered checkerboard images in processed image 725 and 740 are meant to illustrate that some change has taken place in captured image 705 and captured image 710, but are not meant to represent an accurate depiction of the transformation that has taken place on captured image 705 and captured image 710.

In process block 745, processed image 740 is shifted over and merged with processed image 725 to form composite image 750. This shifting may include shifting all the pixels in processed image 740 a defined distance, causing a portion of the pixels in processed image 740 to overlap pixels of processed image 725. In one embodiment, the pixel values for a portion of the pixels in processed image 740 overwrite (in a memory) a portion of the pixel values of processed image 725 to form composite image 750.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method for combining images, the method comprising:

capturing a first image including a subject from a first camera;

capturing a second image including the subject from a second camera;

applying first pre-processing functions on the first image to produce a first processed image, the first pre-processing functions including applying a distortion component of a rotation matrix to the first image, wherein the rotation matrix defines a corrected relationship between the first and the second image;

applying second pre-processing functions on the second image to produce a second processed image, the second pre-processing functions including applying the rotation matrix to the second image; and blending, in a processing unit, the first processed image and the second processed image to form a composite image different from the first and second images captured by the first and second cameras;

wherein the distortion component and the rotation matrix are pre-determined before capturing the first image and the second image by:

capturing a first calibration image including a calibration subject from the first camera before capturing the first image and the second image;

capturing a second calibration image including the calibration subject from the second camera before capturing the first image and the second image;

identifying corresponding pixel sets, each corresponding pixel set including a first pixel in the first calibration image that corresponds with a second pixel in the second calibration image, wherein the first pixel and the second pixel mark the same point on the calibration subject; and determining the distortion component and a rotation component of the rotation matrix by minimizing a distance between the first pixel in the first calibration image and the second pixel in the second calibration image in each of the corresponding pixel sets, wherein the distortion component and the rotation component are determined in an iterative loop until the distance is converged, and wherein the rotation matrix is the product of the distortion component and the rotation component;

wherein the first camera and the second camera have substantially identical image sensors and optics and are positioned at a known rotation angle, wherein the optics of the first camera and the second camera include a wide-angle lens, and wherein the distortion component corrects for the wide-angle lens; and wherein during calibration the rotation component is kept fixed while an optimized distortion component is determined and the optimized distortion component is kept fixed and used to determine an optimized rotation component.

2. The method of claim 1, wherein the first pre-processing functions include converting the first image to a cylindrical coordinate system, and wherein the second pre-processing functions include converting the second image to the cylindrical coordinate system.

3. The method of claim 1, wherein a distortion value representing the distortion component of the rotation matrix and a rotation matrix value representing the rotation matrix are stored in a memory communicatively coupled to a processor disposed in the processing unit.

4. The method of claim 1, wherein blending the first processed image and the second processed image to form the composite image includes shifting all the pixels in the processed second image a defined distance, causing a portion of the pixels in the second processed image to overlap the first processed image.

5. The method of claim 1, wherein applying the rotation matrix to the second image includes multiplying the rotation matrix and each pixel in the second image to achieve real-time processing of the composite image.

6. The method of claim 1, further comprising storing the composite image to a memory communicatively coupled to a processor disposed in the processing unit and rendering the composite image to a display device.

7. The method of claim 1, wherein the distortion component and the rotation component are calculated using Nelder-Mead Simplex Method.

8. The method of claim 1, wherein a portion of the first processed image overwrites in a memory a portion of the second processed image to form the composite image.

9. The method of claim 1 wherein the optimized distortion component is used as the distortion component, the optimized rotation component is used as the rotation component, and the optimized distortion component and the optimized rotation component are multiplied to form the rotation matrix.

10. A non-transitory machine-accessible storage medium that provides instructions that, when executed by a computer, will cause the computer to perform operations comprising:
receiving a first image including a subject captured from a first camera;
receiving a second image including the subject captured from a second camera;
applying first pre-processing functions on the first image to produce a first processed image, the first pre-processing functions including applying a distortion component of a rotation matrix to the first image, wherein the rotation matrix defines a corrected relationship between the first and the second image;
applying second pre-processing functions on the second image to produce a second processed image, the second pre-processing functions including applying the rotation matrix to the second image; and
blending, in a processing unit, the first processed image and the second processed image to form a composite image;
wherein the distortion component and the rotation matrix are pre-determined before capturing the first image and the second image by:
capturing a first calibration image including a calibration subject from the first camera before capturing the first image and the second image;
capturing a second calibration image including the calibration subject from the second camera before capturing the first image and the second image;
identifying corresponding pixel sets, each corresponding pixel set including a first pixel in the first calibration image that corresponds with a second pixel in the second calibration image, wherein the first pixel and the second pixel mark the same point on the calibration subject; and
determining the distortion component and the rotation component of the rotation matrix by minimizing a distance between the first pixel in the first calibration image and the second pixel in the second calibration image in each of the corresponding pixel sets, wherein the distortion component and the rotation component are determined in an iterative loop until the distance is converged, and wherein the rotation matrix is the product of the distortion component and the rotation component;
wherein the first camera and the second camera have substantially identical image sensors and optics and are positioned at a known rotation angle, wherein the optics of the first camera and the second camera include a wide-angle lens, and wherein the distortion component corrects for the wide-angle lens; and
wherein during calibration the rotation component is kept fixed while an optimized distortion component is determined and the optimized distortion component is kept fixed and used to determine an optimized rotation component.

11. The non-transitory machine-accessible storage medium of claim 10, wherein the first pre-processing functions include converting the first image to a cylindrical coordinate system, and wherein the second pre-processing functions include converting the second image to the cylindrical coordinate system.

12. The non-transitory machine-accessible storage medium of claim 10, wherein a distortion value representing the distortion component of the rotation matrix and a rotation matrix value representing the rotation matrix are stored in a memory communicatively coupled to a processor disposed in the processing unit.

13. The non-transitory machine-accessible storage medium of claim 10, wherein blending the first processed image and the second processed image to form the composite image includes shifting all the pixels in the processed second image a defined distance, causing a portion of the pixels in the second processed image to overlap the first processed image.

14. The non-transitory machine-accessible storage medium of claim 10, wherein applying the rotation matrix to the second image includes multiplying the rotation matrix and each pixel in the second image to achieve real-time processing of the composite image.

15. The non-transitory machine-accessible storage medium of claim 10, wherein the distortion component and the rotation component are calculated using Nelder-Mead Simplex Method.

16. The non-transitory machine-accessible storage medium of claim 10 wherein the optimized distortion component is used as the distortion component, the optimized rotation component is used as the rotation component, and the optimized distortion component and the optimized rotation component are multiplied to form the rotation matrix.

17. An imaging system comprising:
a first camera and a second camera, wherein the first camera and the second camera have substantially identical image sensors and optics;
a processing unit including communications interface to communicate with the first and the second camera; and
a non-transitory machine-accessible storage medium that provides instructions that, when executed by the imaging system, will cause the imaging system to perform operations comprising:
receiving a first image including a subject captured from the first camera;
receiving a second image including the subject captured from the second camera;
storing the first image and the second image to a memory;
performing, with the processing unit, first pre-processing functions on the first image to produce a first processed image, the first pre-processing functions including applying a distortion component of a rotation matrix to the first image, wherein the rotation matrix defines a corrected relationship between the first and the second image;
performing, with the processing unit, second pre-processing functions on the second image to produce a second processed image, the second pre-processing functions including applying the rotation matrix to the second image, wherein the rotation matrix is a product of the distortion component and a rotation component, and wherein the rotation component is not applied to the first image; and
blending, in the processing unit, the first processed image and the second processed image to form a composite image;
wherein the optics of the first camera and the second camera include a wide-angle lens, and wherein the distortion component corrects for the wide-angle lens; and
wherein during calibration the rotation component is kept fixed while an optimized distortion component is determined and the optimized distortion component is kept fixed and used to determine an optimized rotation component.

18. The imaging system of claim 17, further comprising:
a mount, common to the first camera and the second camera, wherein the mount contains user-selectable positions for the first camera and the second camera, the user-selectable positions having known rotation angles between the first camera and the second camera.

19. The imaging system of claim 18, wherein the user-selectable positions with known rotation angles between the first and the second camera have rotation matrices that correspond to the user-selectable positions, the rotation matrices stored in the memory as pre-processing values.

20. The imaging system of claim 17, wherein the first pre-processing functions include mapping the first image to a cylindrical coordinate system, and wherein the second pre-processing functions include mapping the second image to a cylindrical coordinate.

21. The imaging system of claim 17, wherein blending the first processed image and the second processed image to form the composite image includes shifting all the pixels in the processed second image a defined distance, causing a portion of the pixels in the second processed image to overlap the first processed image.

22. The imaging system of claim 17, wherein applying the rotation matrix to the second image includes multiplying the rotation matrix and each pixel in the second image to achieve real-time processing of the composite image.

23. The imaging system of claim 17 wherein the optimized distortion component is used as the distortion component, the optimized rotation component is used as the rotation component, and the optimized distortion component and the optimized rotation component are multiplied to form the rotation matrix.

* * * * *